United States Patent
Langerbeins et al.

(10) Patent No.: US 9,243,130 B2
(45) Date of Patent: *Jan. 26, 2016

(54) INORGANIC NANOPARTICLES AND POLYMER COMPOSITE PRODUCED THEREFROM

(75) Inventors: Klaus Langerbeins, Geesthacht (DE); Uwe Dietrich Kühner, Hamburg (DE); Werner Siol, Darmstadt (DE)

(73) Assignee: Evonik Nanoresins GmbH, Geesthacht (DE)

( * ) Notice: Subject to any disclaimer, the term of this patent is extended or adjusted under 35 U.S.C. 154(b) by 458 days.

This patent is subject to a terminal disclaimer.

(21) Appl. No.: 12/988,488

(22) PCT Filed: Apr. 20, 2009

(86) PCT No.: PCT/EP2009/002854
§ 371 (c)(1),
(2), (4) Date: Oct. 18, 2010

(87) PCT Pub. No.: WO2009/127433
PCT Pub. Date: Oct. 22, 2009

(65) Prior Publication Data
US 2011/0040031 A1 Feb. 17, 2011

(30) Foreign Application Priority Data
Apr. 18, 2008 (EP) .................... 08007582

(51) Int. Cl.
| C08L 31/02 | (2006.01) |
| B82Y 30/00 | (2011.01) |
| C08K 9/04 | (2006.01) |
| C08K 9/06 | (2006.01) |
| C09C 1/30 | (2006.01) |
| C09C 3/08 | (2006.01) |
| C09C 3/12 | (2006.01) |

(52) U.S. Cl.
CPC . *C08K 9/04* (2013.01); *B82Y 30/00* (2013.01); *C08K 9/06* (2013.01); *C09C 1/3063* (2013.01); *C09C 1/3081* (2013.01); *C09C 3/08* (2013.01); *C09C 3/12* (2013.01); *C01P 2004/62* (2013.01); *C01P 2004/64* (2013.01)

(58) Field of Classification Search
CPC ............ B82Y 30/00; C08K 9/04; C08K 9/06; C09C 3/12; C09C 1/3063; C09C 1/3081; C09C 3/08
USPC .................. 106/481, 482, 490; 524/493, 832
See application file for complete search history.

(56) References Cited

U.S. PATENT DOCUMENTS 8,043,701 B2 * 10/2011 Edelmann et al. .......... 428/402.2
2002/0098243 A1 7/2002 Edelmann et al.
2007/0238804 A1 * 10/2007 Ho et al. ..................... 522/77

FOREIGN PATENT DOCUMENTS

| CN | 1352672 | 6/2002 | |
| DE | 10100633 | 6/2002 | |
| EP | 0505230 A1 * | 9/1992 | ............... C08F 2/44 |
| JP | 2002265870 | 9/2002 | |
| JP | 2003171120 | 6/2003 | |
| JP | 2006219657 | 8/2006 | |
| WO | 00/73393 | 12/2000 | |

OTHER PUBLICATIONS

Iler, The Chemistry of Silica Solubility, Polymerization, Colloid and Surface Properties, and Biochemistry, John Wiley & Sons, Inc., 1979, Chapter 6, 6 pages.
Ondeo Nalco, Nalco Colloidal Products, 1999, 1 page.
WO 00/73393 published Dec. 7, 2000 is the English equivalent of CN 1352672.
US 2002/0098243 published Jul. 25, 2002 is the English equivalent of JP 2002-265870.
English Abstract of JP2006219657, published Aug. 24, 2006.
English Abstract of JP 2003171120, published Jun. 17, 2003.

* cited by examiner

*Primary Examiner* — David W Wu
*Assistant Examiner* — Marie Reddick
(74) *Attorney, Agent, or Firm* — Casimir Jones, S.C.

(57) ABSTRACT

The invention relates to metal oxide or semimetal oxide nanoparticles having an average particle size of from 2 to 250 nm, characterized in that the nanoparticles have at least two different, free-radically polymerizable groups on the surface. The invention further relates to nanocomposites produced from such nanoparticles and also processes for producing them.

15 Claims, No Drawings

INORGANIC NANOPARTICLES AND POLYMER COMPOSITE PRODUCED THEREFROM

This application is a §371 U.S. National Entry of International Application No. PCT/EP2009/002854, filed Apr. 20, 2009, which claims the benefit of European Application No. 08007582.3, filed Apr. 18, 2008.

The invention relates to inorganic nanoparticles, in particular nanoparticles based on metal oxides and semimetal oxides, in particular the oxides of silicon, titanium, zirconium, cerium, yttrium, aluminium, zinc, antimony and mixtures thereof, having free-radically polymerizable groups on the particle surface, dispersions containing these nanoparticles and the polymer composites produced from these particle dispersions.

Inorganic nanoparticles having polymerizable groups on the surface are known, e.g. from scratch-resistant coatings based on $SiO_2$ particles modified with vinyl groups in dipropylene glycol diacrylate as dispersion medium (DE 69826226).

DE 10100633 describes inorganic metal oxides and semimetal oxides having groups of the allyl or vinyl type fixed to the surface by means of organosilicon compounds.

Fadel (Thesis 2004 Darmstadt) utilizes the Stöber process for the synthesis of methacryloxypropyl-modified $TiO_2$ particles to synthesize $TiO_2$/polybutyl acrylate impact modifiers. Peyrelasse et al. (Langmuir, 22, 6683 (2006)) examined the rheological behaviour of polybutyl acrylate filled with Stober $SiO_2$-grafted polybutyl acrylate chains.

Networks based on methacryloxypropyl-grafted $SiO_2$ nanoparticles and methyl methacrylate are described by Mauger et al. (Polym Int 53: 378 (2004)).

DE 199 25 331 discloses nanoparticle-modified binders which are produced by reaction of carboxyl-functional nanoparticles with epoxy-functional binders. This reaction is said to achieve a particularly good distribution of the nanoparticles in the matrix and eliminate the frequently observed compatibility problems in nanoparticle-containing systems.

DE 102 59460 describes nanoparticles which are modified with azo initiators and by means of which good incorporation of the nanoparticles is achieved.

Nanoparticles improve the properties of materials in many applications. Nanocomposites can improve, inter alia, the scratch and abrasion resistance (tribology), the mechanical properties (tensile strength, modulus, impact toughness), barrier properties (gas barrier), the burning behaviour, flow properties (rheology) and electric properties. The index of refraction of plastics can be improved by means of highly refractive nanoparticles.

It is an object of the invention to provide nanoparticles having free-radically polymerizable groups, which can be produced easily and make a good bonding of inorganic nanoparticles and organic polymers grafted therewith possible. The objective is, in particular, to achieve effective bonding of inorganic nanoparticles and organic polymers by simple free-radical polymerization.

The invention achieves this object by means of a metal oxide or semimetal oxide nanoparticle having an average particle size of from 2 to 250 nm, where these nanoparticles have at least two different, free-radically polymerizable groups on the surface.

According to the invention, preference is given to nanoparticles from the group consisting of semimetal oxides and metal oxides of main groups 3 and 4, transition metal oxides, oxides of the lanthanides and actinides and also mixtures thereof and core-shell particles having a core or shell based on these oxides. Examples which may be mentioned are the oxides of silicon, titanium, zirconium, cerium, yttrium, aluminium and antimony. However, the use of other metal oxides or semimetal oxides can be of significance for various applications. In this case, nanoparticles having a core-shell structure as described in DE 10100633 are also of interest. Particular preference is given to nanoparticles based on $SiO_2$.

The $SiO_2$ particles preferably comprise at least 50% of individual, unaggregated or unagglomerated primary particles. Further preferred lower limits are 70%, 80%, 90%, 95% and 98%. These percentages are by weight. According to this aspect of the invention, it is thus possible to provide a dispersion which is essentially free of aggregates and/or agglomerates of the $SiO_2$ particles. This improves the processability (lower viscosity) and the mechanical properties of intermediate and end products produced therewith. Pyrogenic silicas known in the prior art have aggregation/agglomeration of the primary particles to form larger structures, which is due to the production route (flame pyrolysis) and makes the processability of intermediate and end products produced therewith difficult.

The average particle size of the nanoparticles is in the range from 2 to 250 nm. Preferred lower limits for the particle size are 4 nm, 5 nm and 8 nm. Preferred upper limits are 150 nm, 50 nm and 30 nm. The upper and lower limits mentioned can be combined in any way to give ranges according to the invention.

The particle size can be determined on a "Dynamic Light Scattering Particle Size Analyzer LB-550" from Horiba at a concentration of not more than 10% by weight of particles, with the dispersion being allowed to have a maximum dynamic viscosity of 3 mPas at 25° C. The median (D50) of the particle size distribution is reported as particle size.

In the solid, the particle size can be determined by transmission electron microscopy. For this purpose, at least 100 particles are measured and a particle size distribution is constructed.

The two different free-radically polymerizable groups (hereinafter referred to as A and B groups) are, according to one aspect of the invention, selected so that they do not both preferentially form alternating copolymers with one another. Accordingly, the two copolymerization parameters $$r_A = k_{AA}/k_{AB}$$

$$r_B = k_{BB}/k_{BA}$$

should preferably not both be less than 0.5; preference is given to the two copolymerization parameters not both being less than 1.

According to a further preferred aspect of the invention, the following rules apply to the copolymerization behaviour of a monomer M1 (e.g. the monomer in which the particles are dispersed) with the reactive groups on the particles (in each case monomer 2):

for the copolymerization of M1 with A:
  r1<0.8 (preferably <0.5)
  r2>0.9 (preferably >1.5);
for the copolymerization of M1 with B:
  r1>1.0 (preferably >3)
  r2<0.5 (preferably <0.3).

The r parameters of the reactive groups on the surface can be measured only with difficulty. For this reason, the r parameters of the closest low molecular weight compounds are employed. Here, the groups are classified according to the following scheme:

| Group: | Reference: |
|---|---|
| acrylo | methyl acrylate |
| methacrylo | methyl methacrylate |
| itaconyl | itaconic acid |
| crotonyl | methyl crotonate |
| vinyl | vinyl acetate |
| allyl, alkenyl | allyl acetate |
| styryl | styrene |

Groups which are not listed here are evaluated as the fragment to the first metal atom by replacing the metal atom by a hydrogen atom. An acrylamidopropylsilane is evaluated as N-propylacrylamide.

Salts such as oleic acid salts (e.g. on basic aluminium oxide surfaces), vinylpyridine (on acidic surfaces) are evaluated like the free monomer. Polymers having reactive side chains are evaluated like the respective side chain group alone (e.g. polyallyl methacrylate like allyl acetate).

The nanoparticles of the invention preferably have firstly methacryl, acryl, styryl and/or itaconyl groups (A groups) and secondly vinyl, allyl, alkenyl and/or crotonyl groups (B groups) on the surface.

The concentration of each of these groups on the surface of the nanoparticles is preferably from 0.01 to 10 groups per nm$^2$, preferably from 0.1 to 4 groups per nm$^2$, more preferably from 0.1 to 1 group per nm$^2$.

Apart from the polymerizable groups, the particles can also bear groups which do not react in a polymerization. In some embodiments, the nanoparticles contain nonpolymerizable, hydrophobicizing groups, e.g., methyl, ethyl, propyl, phenyl.

The surface area of the particles can in the case of spherical particles be calculated from the particle size. The calculation is carried out using the median of the particle size distribution (D50). The specific surface area ($A_0$) can then be calculated with the aid of the density of the particle ($\rho$):

$$A_0 = 6/(\rho \times D50)$$

The density of colloidal silicon dioxide is 2.1 g/cm$^3$. The number of reactive groups per unit surface area ($n_R^A$) is given by the number of reactive groups ($n_R^M$) per unit mass divided by the specific surface area:

$$n_R = (n_R^M/A_0).$$

The number of reactive groups per unit mass $n_R^M$ can be determined by suitable analytical methods. If silanes of the alkoxysilane, acyloxysilane, acetoxysilane, alkenoxysilane or oximosilane type are used in order to attach the reactive groups to the surface, complete hydrolysis of the silane can be assumed, i.e. all groups used are present on the surface of the particles.

The number of polymerizable groups on the particle surface can also be determined by NMR spectroscopy or by means of DSC (differential scanning calorimetry). These methods can be employed particularly when suitable analytical methods for the determination of reactive groups (for example iodine number determination in the case of vinyl groups) are not available. In DSC, the heat of polymerization is measured as a measure of the number of polymerizable groups on the particle surface. In this DSC determination, a defined amount of the surface-modified SiO$_2$ particles is admixed with a standardized peroxide solution and the heat of reaction is measured. The method is described, for example, in DE 36 32 215 A1.

Greater preference is given to nanoparticles which bear from 0.01 to 10 methacryl groups/nm$^2$ and additionally from 0.01 to 10 vinyl or allyl groups/nm$^2$ on the surface. Particular preference is given to nanoparticles which contain from 0.01 to 6 methacryloxypropyl groups/nm$^2$ and also from 0.01 to 6 vinyl groups/nm$^2$ on the surface. For a number of applications (see below), it is advantageous for the particles to have only from 0.01 to 1 methacryl group/nm$^2$ but from 1 to 10 vinyl groups/nm$^2$ on the surface.

The invention also provides a polymerizable composite (polymer composite) containing nanoparticles according to the invention. The polymerizable resin used for producing such a composite will hereinafter also be referred to as dispersion medium. The surface-modified nanoparticles are dispersed therein. On curing of the resin, the nanoparticles are copolymerized by means of the polymerizable groups on the surface into the network being formed and can, owing to the plurality of reactive groups on the surface of a particle, form crosslinking points. The fact that the particles are present in dispersed form in the resin (preferably a (meth)acrylate) allows uniform dispersion of the particles during the polymerization. If the particles are not present in dispersed form in the (meth)acrylate, agglomeration or heterogeneous distribution of the particles in the polymer can occur in the polymerization.

Preferred dispersion media for the particles modified on the surface with groups of type A and type B are C1-C8-esters of acrylic acid. C1-C8-Alkylesters of methacrylic acid can also be used as dispersion media.

According to the invention, preference is given to at least 50% by weight, preferably at least 70% by weight, more preferably at least 80% by weight, of the nanoparticles being present in the form of individual, unaggregated or unagglomerated primary particles. These percentages by weight are based on the total weight of the nanoparticles in the dispersion.

A dual surface modification according to the invention (i.e. modification with 2 different, free-radically polymerizable groups) of the SiO$_2$ particles has the advantage that the SiO$_2$ particles are incorporated into the polymer chains at different stages of the polymerization. Thus, the methacrylate groups on the particle surface ensure that the SiO$_2$ particles are joined to the polymer chains even in the initial phase of the polymerization and a good distribution of the particles in the polymer matrix is ensured by this bonding. On the other hand, the vinyl groups are effective particularly at high conversions, i.e. in the end polymerization. The events at the beginning of the polymerization are thus linked with the events in the end polymerization by means of the dual modification. Homogeneous, stretchable networks, for example, result in this way.

The particular importance of this surface modification with two different, free-radically polymerizable groups results in the completely different copolymerization behaviour of the groups A and B with the various free-radically polymerizable monomers.

Thus, in the free-radical polymerization of a dispersion of nanoparticles having methacryl groups and vinyl groups on the surface in methyl acrylate as medium, the methacryl groups of the particle surface are preferentially incorporated into the polymethyl acrylate chains while the vinyl groups copolymerize only to a small extent or not at all as a result of the different copolymerization parameters of the pairings:

methyl acrylate=M1/methyl methacrylate=M2
where r1=0.4, r2=2
methyl acrylate=M1/vinyl acetate=M2
where r1=9, r2=0.05
methyl acrylate=M1/ethylene=M2
where r1=11, r2=0.2.

Here, it is assumed that the methacryloxypropyl of the particle surface behaves like a methacrylic ester and the vinyl groups introduced, for example, by means of vinyltrimethoxysilane copolymerize like normal vinyl groups, e.g. of the vinyl acetate or ethylene type. On the subject of copolymerization parameters, see J. Brandrup, E. H. Immergut, Polymerhandbook, 3rd Edition, 1989, J. Wiley & sons, N.Y.

The copolymerization ratios in the polymerization of these nanoparticles having methacryloxypropyl and vinyl groups on the surface as a dispersion in methyl methacrylate are similar. Thus, the values for the system MMA/ethylene are:
methyl methacrylate=M1/ethylene=M2
where $r1=17$, $r2=0.2$.

A value of about 1 is assumed as an approximation for the copolymerization parameters of the methacryloxypropyl group with MMA, corresponding to the usual copolymerization parameters of various methacrylate esters with one another.

Thus, in the case of MMA as dispersion medium, a statistical incorporation of the methacryloxypropyl groups of the particle surface into the PMMA chains and a discrimination of the vinyl groups is found.

The synthesis of polymer composites from the nanoparticles of the invention having 2 different, polymerizable groups on the particle surface is not restricted to the use of (meth)acrylic esters as dispersion medium or resin.

Rather, it is also possible to use other monomers which are copolymerizable with the reactive groups on the surface of the nanoparticles of the invention (preferably firstly (meth) acrylic esters and secondly vinyl, allyl, hexenyl and crotonyl groups). Examples which may be mentioned are (meth) acrylic acids, (meth)acrylamides and (meth)acrylonitriles, styrene, vinyl esters and vinylamides.

The proportion of these additional monomers in the total formulation (composite) is preferably 0-50% by weight, preferably 0-20% by weight.

The production of the nanoparticles of the invention having 2 different, free-radically polymerizable groups on the surface is carried out, for example, by reacting colloidal metal oxide or semimetal oxide with a mixture of various silanes, e.g. methacryloxypropyltrimethoxysilane and vinyltrimethoxysilane.

The copolymerization of the polymerizable groups on the nanoparticles with the monomers of the dispersion medium can either be carried out in bulk or in the presence of solvents. Furthermore, it is also possible for it to be carried out as a precipitation polymerization.

Particularly in polymerization in solvents, there is the opportunity of firstly generating polymer 1-grafted nanoparticles by addition of a first monomer (monomer 1) to react with, for example, the methacryloxypropyl groups of the particle surface and subsequently binding a polymer 2 to the nanoparticles via the groups remaining on the particle surface, e.g. vinyl groups, by addition of a second monomer (monomer 2). Polymer 1-polymer 2 block copolymers linked via nanoparticles are obtained in this way.

Advantages of the use of the dual-modified nanoparticles of the invention are found, for example, in the curing of methacrylate casting resins. Thus, the methacrylate groups present on the surface of the nanoparticles bring about early bonding of the nanoparticles to the polymethacrylate being formed and thus lead to good compatibility of the particles with the methacrylate matrix.

In contrast, the vinyl groups of the particle surface take part in the end polymerization. Thus, pure methacrylates display a quite low ceiling temperature (e.g. about 160° C. for PMMA) because of the stiff polymethacrylate chain.

An end polymerization is therefore possible only with difficulty. Residual methacrylate monomers will always be left over in the equilibrium. This thermodynamically determined residual content of methacryl groups can usually be reduced by addition of acrylic esters (ceiling temperature almost 400° C.). Owing to the pronounced irritant action of many acrylate monomers, the use of these monomers is restricted especially in medical applications.

Here, the dual-modified nanoparticles provide assistance. As mentioned above, the vinyl groups are left over in a copolymerization of MMA with vinyl groups while the methacrylates are preferentially incorporated into the polymer chains. In this way, the remaining residual monomer, e.g. MMA, is virtually titrated away by copolymerization with the vinyl groups present on the nanoparticles. Ultimately, a small number of vinyl groups remains as residual monomer groups on the particle surface. However, these are not migration-active because of the good bonding of the nanoparticles into the polymer matrix.

As shown by way of example below for acrylic rubbers, the dual-modified nanoparticles of the invention can be used quite generally as crosslinkers for vinyl polymers. In a 1st reaction stage, the nanoparticles are bound to the polymers via the (meth)acryloxy group, while crosslinking via the vinyl, allyl, hexenyl or crotonyl groups occurs in a 2nd stage.

To produce acrylic rubbers, the nanoparticles of the invention are dispersed in C1-C8-alkyl (meth)acrylates. Preferred monomers are ethyl, butyl and 2-ethylhexyl acrylates. In general, the monomer mixture is selected so that a copolymer having a glass transition temperature of <0° C., preferably <−20° C., results.

The glass transition temperature of a copolymer can be calculated by the Fox equation (T.G. Fox, Bull. Am. Phys. Soc. (Ser. II), 1, 123 (1956)).

Preferred nanoparticles for the synthesis of acrylic rubber are particles which contain both (meth)acryl and vinyl groups on the particle surface. Particular preference is given to $SiO_2$ particles modified with methacryloxypropyl and with vinyl groups.

The polymerization of the nanoparticles bearing, for example, methacryl and vinyl groups dispersed in, for example, butyl acrylate by the casting process is carried out using initiators which disintegrate thermally, redox initiators, UV initiators or by means of hard radiation. In the case of polymerization by means of thermally active initiators, preference is given to using initiator mixtures in which one species disintegrates at relatively low temperatures to form relatively stable C radicals (e.g. t-amyl peroxypivalate, half life 1 h at 71° C.) and the other species disintegrates only at relatively high temperature to form grafting-active O and C radicals (e.g. t-butyl peroxybenzoate, half life 1 h at 124° C.)

The early bonding of the nanoparticles (via the methacryloxypropyl group) to the polybutyl acrylate being formed and the inclusion of the nanoparticles in the end polymerization events via the vinyl groups results in formation of acrylic rubbers which have good mechanical and optical properties. The hardness of these rubbers can be adjusted, for example, via the content of nanoparticles and the glass transition temperature. In general, the content of nanoparticles in this application is in the range 5-70% by weight, preferably 10-50% by weight.

It has been found that the production of acrylic rubbers with the aid of the dual-modified nanoparticles can also readily be carried out as a two-stage process. Here, nanoparticles having (meth)acryl groups and groups of the vinyl, allyl, alkenyl or crotonyl type are, in a 1st stage, dispersed in, for example, butyl acrylate, if appropriate in the presence of inert solvents, e.g. butyl acetate, and polymerized to a conversion of about 90% by means of an initiator, e.g. AIBN, which disintegrates to form stable radicals having little grafting activity. The solvent and any butyl acrylate still present are subsequently removed.

The nanoparticle-containing, viscous liquid rubber obtained in this way is, after addition of grafting-active initiators which disintegrate thermally or UV initiators, introduced into an appropriate mould and vulcanized by action of heat, light or, without addition, directly by means of hard radiation.

This vulcanization of the nanoparticle-containing liquid rubber can be considered to be a peroxide curing, with the vinyl groups of the nanoparticles acting as comonomers to increase the crosslinking effect. Preferred monomers for this two-stage production of acrylate rubber are butyl acrylate and 2-ethylhexyl acrylate.

This form of the synthesis of acrylate rubber via polybutyl acrylate containing nanoparticles which contain vinyl groups and are fixed via methacrylate groups is virtually shrinkage-free, odourless and emission-free. In this process, the hardness can be adjusted via the content of nanoparticles, the number of polymerizable groups on the particle surface and the amount of peroxide used.

In this liquid rubber process, preference is given to nanoparticles which have a relatively low content of (meth)acryl groups, e.g. 0.01-1 group/nm$^2$, and at the same time a relatively high content of vinyl groups, e.g. 2-10 vinyl groups/nm$^2$.

Apart from this pure liquid rubber synthesis without any addition of volatile constituents during curing, it is also possible to carry out a two-stage process by, in a 1st stage, polymerizing the dual-modified nanoparticles in butyl acrylate and a solvent, then taking off the solvent and replacing it by other monomers, e.g. MMA or styrene.

Thus, for example, a mixture of 80 parts of polybutyl acrylate from the 1st stage (containing, for example: 20% by weight of dual-modified nanoparticles) and 20 parts of styrene is admixed in the 2nd stage with peroxide, introduced into a mould and polymerized. In this case, an acrylic rubber which is crosslinked via nanoparticles and polystyrene domains results. In the case of styrene as comonomer, allyl groups are of interest as polymerizable groups B on the particle surface.

The metal oxide particles preferably have a surface modification to functionalize them and, if appropriate, make them compatible with the monomers. Methods of surface functionalization which are known and familiar in the art are, for example, silanization of the surface, reaction with titanates and zirconates, alcoholysis, use of acidic, basic or ionic compounds which form ionic bonds with the polar surface, free-radical attachment of polymers and monomers and also the purely physical adhesion of hydrophobic polymers.

Oxides having an acidic surface, e.g. silicon dioxide, can form ionic bonds with basic molecules. These include, preferably, nitrogen compounds. These nitrogen compounds can bear further polymerizable groups. Examples are vinylpyridine, vinylpyrrolidone and allylamine. Oxides having a basic surface, e.g. aluminium oxide and zinc oxide, can react with organic acids and form an ionic bond. Examples are oleic acid, acrylic acid and methacrylic acid.

The silanization of the surface of the SiO$_2$ particles is preferably carried out using organosilanes or organosiloxanes. Silanization is a technology which is well known in the art.

The organosilanes or organosiloxanes are preferably selected from the group consisting of organosilanes of the formula R$^1_a$SiX$_{4-a}$, organosilanes of the formula (R$^1_3$Si)$_b$NR$^1_{3-b}$ and organosiloxanes of the formula R$^1_n$SiO$_{(4-n)/2}$, where each R$^1$ is selected independently from among hydrocarbon radicals having from 1 to 18 carbon atoms or organofunctional hydrocarbon radicals having from 1 to 18 carbon atoms or a hydrogen atom, each X is selected independently from among hydrolysable groups, a=0, 1, 2 or 3, b=1, 2 or 3 and n is from 2 to 3, inclusive. Examples of hydrolysable groups are halogen, alkoxy, alkenoxy, acyloxy, oximino and aminoxy groups. Among organofunctional hydrocarbon radicals, particular preference is given to unsaturated radicals which are reactive in a free-radical polymerization. Examples of such organic radicals are those having methacryloyl, acryloyl, styryl, vinyl, hexenyl and allyl functions or groups.

To functionalize the particles with reactive groups, use can be made of, for example, vinyltrimethoxysilane, vinyltriethoxysilane, methylvinyldimethoxysilane, methylvinyldiethoxysilane, vinyldimethylmethoxysilane, vinyldimethylethoxysilane, divinyldimethoxysilane, divinyldiethoxysilane, vinyltriacetoxysilane, vinyltrichlorosilane, methylvinyldichlorosilane, dimethylvinylchlorosilane, divinyldichlorosilane, vinyltris(2-methoxyethoxy)silane, hexenyltrimethoxysilane, gamma-methacryloxypropyltrimethoxysilane, gamma-methacryloxypropyltriethoxysilane, gamma-methacryloxypropyltriacetoxysilane, methacryloxymethyltrimethoxysilane, methacryloxymethyltriethoxysilane, (methacryloxymethyl)methyldimethoxysilane, (methacryloxymethyl)methyldiethoxysilane, acryloxypropyltrimethoxysilane, acryloxypropyltriethoxysilane, gamma-methacryloxypropyltrichlorosilane, gamma-methacryloxypropyldimethylchlorosilane, vinylbenzylethylenediaminepropyltrimethoxysilane, vinylbenzylethylenediaminepropyltrimethoxysilane hydrochloride, allylethylenediaminepropyltrimethoxysilane, allylethylenediaminepropyltriethoxysilane, allyltrichlorosilane, allylmethyldichlorosilane, allyldimethylchlorosilane, allyltrimethoxysilane, allyltriethoxysilane, allylmethyldimethoxysilane, allylmethyldiethoxysilane, allyldimethylmethoxysilane, allyldimethylethoxysilane, divinyltetramethyldisilazane, divinyltetramethyldisiloxane, trimethyltrivinylcyclotrisiloxane, tetramethyltetravinylcyclotetrasiloxane, pentamethylpentavinylcyclopentasiloxane and hexamethylhexavinylcyclohexasiloxane. It is also possible to use mixtures of these silanes with one another or with unfunctionalized silanes such as chlorotrimethylsilane or octyltrimethoxysilane. The silanization can also be carried out in a plurality of steps and in different solvents.

In an alternative method of effecting the surface modification, the SiO$_2$ particles can be treated with alcohols, polyols or mixtures thereof. As a result of the treatment, silanol groups on the surface of the SiO$_2$ particle bond chemically to the hydroxy groups of the alcohol, forming ester groups bound to the surface. This technique is described, for example, in U.S. Pat. No. 2,801,185. For the purposes of the present invention, preference is given to using at least partially unsaturated primary alcohols. Examples of such alcohols are hydroxyethyl acrylate, hydroxyethyl methacrylate, and allyl alcohol.

A further method of effecting functionalization is modification of the surface with anchor groups, e.g. functionalized silanes. These silanes have a reactive group which in a second step can react with a molecule which itself has two reactive groups. The one group reacts with the silane and the other is reactive in the free-radical polymerization.

Example 1

Production of Nanoparticle Dispersions

P1

A colloidal silica sol (40% by weight of SiO$_2$ in water, particle size (D50) by dynamic light scattering: 25 nm, stabilized with NaOH) was stirred over an acidic ion exchanger (Amberjet 1200H, Rohm & Haas) until a pH of 2-3 had been reached. After filtration from the ion exchanger, 2000 g of the acidic sol were stirred with 59.6 g of MEMO and 35.6 g of vinyltrimethoxysilane for 2 hours.

The sol was diluted with 2800 g of isopropanol so that a sol having a solids content of 17% by weight in a mixture of isopropanol and water in a ratio of 70:30 was obtained. The particles have 1.6 vinyl groups per $nm^2$ (from vinyltrimethoxysilane) and 1.6 methacryl groups per $nm^2$ (from gamma-methacryloxypropyltrimethoxysilane) on the surface.

P2

A colloidal silica sol (40% by weight of $SiO_2$ in water, particle size (D50) by dynamic light scattering: 25 nm, stabilized with NaOH) was stirred over an acidic ion exchanger (Amberjet 1200H, Rohm & Haas) until a pH of 2-3 had been reached. After filtration from the ion exchanger, 400 g of the acidic sol were stirred with 11.9 g of MEMO and 7.1 g of vinyltrimethoxysilane for 2 hours. The mixture was admixed with 2400 g of isopropanol and distilled under reduced pressure until about 450 g remained.

1600 g of stabilized butyl acrylate (stabilized with methoxyhydroquinone) were added and the mixture was distilled under reduced pressure until the isopropanol had been removed. A dispersion having a solids content of 33.4% by weight was obtained. The particles have 1.6 mmol of vinyl groups/$nm^2$ (from vinyltrimethoxysilane) and 1.6 mmol/$nm^2$ of methacryl groups (from gamma-methacryloxypropyltrimethoxysilane) on the surface.

Example 2

Acrylic Rubber Plate Based on Nanoparticle Dispersion P2

A mixture of 0.07 g of didodecanoyl peroxide 0.11 g of benzoyl peroxide (containing 25% by weight of water)

2 g of butyl acrylate and 48 g of P2 is degassed (about 20 mbar) and introduced into a polymerization chamber at room temperature. External dimensions of the polymerization chamber: 150×200 mm. Construction of the chamber: glass plate/spacing string (3 mm)/glass plate.

Polymerization is subsequently carried out on a water bath firstly at 70° C. for 3 hours and then at 85° C. for 2 hours. End polymerization is effected by heating at 110° C. in an oven for 2 hours.

This gives a colourless, transparent acrylic rubber plate.

Example 3

Acrylic Rubber Plate Based on Particle Dispersion P2 Having a Reduced Content of Nanoparticles The polymerization experiment according to Example 2 is repeated but a different composition is selected:

Weights used:

0.05 g of didodecanoyl peroxide 0.10 g of t-butyl perbenzoate 10 g of butyl acrylate 40 g of P2

After polymerization and subsequent heat treatment (2 hours at 130° C.), a clear, flexible rubber plate having a slight yellow cast was obtained.

Example 4

Acrylic Rubber Plate Based on Particle Dispersion P2 Having a Further Reduced Content of Nanoparticles The experiment according to Example 2 was repeated but a different composition was selected:

Weights used:

0.05 g of didodecanoyl peroxide 0.10 g of dibenzoyl peroxide 20 g of butyl acrylate 30 g of P2

This gave a clear, colourless rubber plate.

Example 5

Synthesis of a Butyl Acrylate Rubber by a 2-Stage Process

A mixture of 13.7 g of P2, 4.2 g of butyl acrylate, 72.7 g of butyl acetate and 0.025 g of AIBN is polymerized at 83° C. under argon as protective gas for 30 minutes while stirring. This gives a fluid, transparent solution; solids content: 15%.

Taking off the volatile constituents gives a clear, colourless, deformable composition.

Crosslinking Experiment:

15 g of the solution are admixed with 2% by weight of dibenzoyl peroxide based on the solid and placed in a glass dish. After drying, the mixture is heated at 140° C. for 2 hours.

This gives a clear, slightly yellowish rubber which reproduces the shape of the glass dish.

Example 6

Use of the Dual-Modified Nanoparticles for Producing Polybutyl Acrylate/Polyvinylpyrrolidone Graft Copolymers A mixture of 43.5 g of P1, 34.3 g of isopropanol, 7.5 g of butyl acrylate and 0.12 g of AIBN is placed under argon as protective gas in a stirred apparatus and heated to 75° C. (internal temperature). After the internal temperature has been reached, it is maintained for 10 minutes. 12 g of N-vinylpyrrolidone are subsequently added dropwise over a period of 30 minutes and the mixture is then stirred at 75° C. for a further 30 minutes.

Cooling to room temperature results in a stable, fluid, transparent dispersion having a solids content of 27.7% by weight.

The invention claimed is:

1. A composition comprising metal oxide or semimetal oxide nanoparticles having an average particle size of from 2 to 250 nm, wherein the nanoparticles have at least two different, free-radically polymerizable groups on the surface;

wherein the at least two different, free-radically polymerizable groups comprise a first polymerizable group selected from the group consisting of methacryl, acryl, styryl, and itaconyl groups, and a second polymerizable group selected from the group consisting of vinyl, allyl, alkenyl, and crotonyl groups;

wherein the concentration of each of the groups on the surface of the nanoparticles is 0.1 to 4 groups per $nm^2$.

2. The composition according to claim 1, wherein the average particle size of the nanoparticles is from at least 4 to not more than 150 nm.

3. The composition according to claim 1, wherein the average particle size of the nanoparticles is from at least 5 to not more than 30 nm.

4. The composition according to claim 1, wherein the average particle size of the nanoparticles is from at least 8 to not more than 20 nm.

5. The composition according to claim 1, wherein the nanoparticles are selected from the group consisting of metal oxides of main groups 3 and 4, transition metal oxides, and oxides of the lanthanides and actinides.

6. The composition according to claim 1, wherein the nanoparticles are $SiO_2$ nanoparticles.

7. The composition according to claim 1, wherein a concentration of each of the groups on the surface of the nanoparticles is 0.1 to 1 group per $nm^2$.

8. The composition according to claim 1, wherein the nanoparticles additionally contain nonpolymerizable, hydrophobicizing groups.

9. The composition according to claim 8, wherein the nonpolymerizable, hydrophobicizing groups are selected from the group consisting of methyl, ethyl, propyl, and phenyl.

10. A composition comprising a curable nanocomposite, wherein the curable nanocomposite comprises at least one curable resin and nanoparticles according to claim 1 dispersed therein.

11. The composition according to claim 10, further comprising $C_1$-$C_8$-alkyl esters of acrylic acid and/or methacrylic acid.

12. The composition according to claim 10, wherein at least 50% by weight of the nanoparticles are present in the form of individual, unaggregated, or unagglomerated primary particles.

13. The composition according to claim 10, wherein at least 70% by weight of the nanoparticles are present in the form of individual, unaggregated, or unagglomerated primary particles.

14. The composition according to claim 10, wherein at least 80% by weight of the nanoparticles are present in the form of individual, unaggregated, or unagglomerated primary particles.

15. The composition according to claim 10, wherein at least 90% by weight of the nanoparticles are present in the form of individual, unaggregated, or unagglomerated primary particles.

* * * * *